(12) United States Patent
Sorokin

(10) Patent No.: US 11,267,398 B2
(45) Date of Patent: Mar. 8, 2022

(54) CONTROL UNIT AND METHOD FOR DEFINING MOVEMENT REGIONS

(71) Applicant: Bayerische Motoren Werke Aktiengesellschaft, Munich (DE)

(72) Inventor: Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 230 days.

(21) Appl. No.: 16/009,802

(22) Filed: Jun. 15, 2018

(65) Prior Publication Data
US 2018/0361919 A1 Dec. 20, 2018

Related U.S. Application Data

(63) Continuation of application No. PCT/EP2016/080745, filed on Dec. 13, 2016.

(30) Foreign Application Priority Data

Dec. 16, 2015 (DE) ..................... 10 2015 225 409.7

(51) Int. Cl.
| | | |
|---|---|---|
| *B60Q 1/52* | (2006.01) | |
| *B60Q 5/00* | (2006.01) | |
| *G08G 1/0967* | (2006.01) | |
| *B60Q 1/50* | (2006.01) | |
| *G08G 1/0955* | (2006.01) | |

(Continued)

(52) U.S. Cl.
CPC ........... *B60Q 1/525* (2013.01); *B60Q 1/0023* (2013.01); *B60Q 1/50* (2013.01); *B60Q 5/006* (2013.01); *B60Q 9/008* (2013.01); *G08G 1/0955* (2013.01); *G08G 1/096716* (2013.01); *G08G 1/096775* (2013.01); *G08G 1/096791* (2013.01);
(Continued)

(58) Field of Classification Search
CPC ...................................... B60Q 1/525
See application file for complete search history.

(56) References Cited

U.S. PATENT DOCUMENTS

| | | | | |
|---|---|---|---|---|
| 7,236,100 B2 * | 6/2007 | Obradovich | ............ | H04L 67/18 340/905 |
| 7,748,021 B2 * | 6/2010 | Obradovich | ...... | H04M 1/72469 725/105 |

(Continued)

FOREIGN PATENT DOCUMENTS

| | | |
|---|---|---|
| DE | 10 2009 009 472 A1 | 8/2010 |
| DE | 10 2009 009 473 A1 | 8/2010 |

(Continued)

OTHER PUBLICATIONS

Google Machine Translation of Japanese Patent Pub. No. JP6566642B2 (hereinafter "the '642 publication") (downloaded on Feb. 11, 2020).*

(Continued)

*Primary Examiner* — Jean Paul Cass
(74) *Attorney, Agent, or Firm* — Crowell & Moring LLP

(57) ABSTRACT

A component for a vehicle configured to drive on a roadway is a control unit that is configured to detect a road user on the roadway, ascertain a portion of the roadway in which the road user can move, and prompt a communication unit of the vehicle to generate an optical output, where via the optical output the road user is indicated the portion of the roadway in which the road user can move.

10 Claims, 2 Drawing Sheets

(51) Int. Cl.
  *B60Q 1/00* (2006.01)
  *B60Q 9/00* (2006.01)
  *G08G 1/16* (2006.01)
(52) U.S. Cl.
  CPC ............ *G08G 1/161* (2013.01); *G08G 1/166* (2013.01); *B60Q 2400/50* (2013.01); *G08G 1/096758* (2013.01)

(56) References Cited

U.S. PATENT DOCUMENTS

| | | | |
|---|---|---|---|
| 8,346,464 B2 * | 1/2013 | Gauffriau | G08G 5/0021 701/120 |
| 8,823,556 B2 * | 9/2014 | Yester | G08G 1/07 340/995.13 |
| 8,954,252 B1 * | 2/2015 | Urmson | G08G 1/167 701/70 |
| 9,434,267 B2 * | 9/2016 | Wang | B64D 27/24 |
| 9,714,012 B1 * | 7/2017 | Hoareau | H01M 10/425 |
| 9,764,703 B2 * | 9/2017 | Hoareau | B60L 50/00 |
| 9,815,633 B1 * | 11/2017 | Kisser | B25J 9/0093 |
| 9,950,814 B1 * | 4/2018 | Beckman | B61L 15/0027 |
| 10,023,309 B2 * | 7/2018 | Brown | B64D 47/06 |
| 10,195,952 B2 * | 2/2019 | Wang | B60L 53/126 |
| 10,332,405 B2 * | 6/2019 | Kopardekar | G08G 5/006 |
| 10,363,826 B2 * | 7/2019 | Wang | B64F 1/36 |
| 10,384,692 B2 * | 8/2019 | Beckman | G06Q 30/0205 |
| 10,421,542 B2 * | 9/2019 | Beckman | B61D 3/16 |
| 10,453,348 B2 * | 10/2019 | Speasl | B64F 1/222 |
| 10,467,685 B1 * | 11/2019 | Brisson | B64F 1/222 |
| 10,493,863 B1 * | 12/2019 | Thrun | B64C 39/026 |
| 10,532,815 B1 * | 1/2020 | Thrun | B64C 39/026 |
| 10,614,515 B1 * | 4/2020 | Brisson | G06Q 20/405 |
| 10,661,896 B2 * | 5/2020 | Ozaki | B64C 39/02 |
| 10,703,480 B1 * | 7/2020 | Thrun | B64D 11/06 |
| 10,899,473 B2 * | 1/2021 | Scherz | B64C 39/024 |
| 10,953,754 B1 * | 3/2021 | Wiegman | B60L 3/12 |
| 10,974,911 B2 * | 4/2021 | Zevenbergen | B65G 47/92 |
| 2012/0025964 A1 | 2/2012 | Beggs et al. | |
| 2012/0068860 A1 * | 3/2012 | Popovic | G08G 1/096783 340/905 |
| 2014/0032034 A1 * | 1/2014 | Raptopoulos | G05D 1/0088 701/25 |
| 2015/0142211 A1 * | 5/2015 | Shehata | H04W 4/42 701/2 |
| 2016/0142211 A1 * | 5/2016 | Metke | H04L 9/3263 713/175 |
| 2016/0200421 A1 * | 7/2016 | Morrison | G05D 1/0077 244/17.23 |
| 2017/0072843 A1 * | 3/2017 | Lection | B60Q 1/50 |
| 2017/0295458 A1 * | 10/2017 | Gao | H04B 17/318 |
| 2017/0323572 A1 * | 11/2017 | Chan | G08G 5/0082 |
| 2018/0056858 A1 * | 3/2018 | Cunningham, III | B60K 35/00 |
| 2019/0329877 A1 * | 10/2019 | Benson | B64C 11/28 |
| 2020/0301445 A1 * | 9/2020 | Jourdan | G05D 1/0676 |

FOREIGN PATENT DOCUMENTS

| | | | | |
|---|---|---|---|---|
| DE | 10 2009 020 910 A1 | | 11/2010 | |
| DE | 10 2011 119 923 A1 | | 5/2013 | |
| DE | 10 2013 222 467 A1 | | 5/2015 | |
| DE | 10 2014 000 935 A1 | | 7/2015 | |
| EP | 2 896 937 A1 | | 7/2015 | |
| JP | 2008-007079 A | * | 6/2006 | |
| JP | 2008-7079 A | | 1/2008 | |
| JP | 6566642 B2 | * | 8/2019 | ............ B60Q 1/085 |
| WO | WO2005118340 | * | 6/2004 | |
| WO | WO 2015/149813 A1 | | 10/2015 | |

OTHER PUBLICATIONS

Google Machine Translation of of Japanese Patent Pub. No. JP2008007079A thatwas filed in 2006 and published in 2008 (hereinafter the '079 publication) (downloaded on Feb. 11, 2020).*
PCT/EP2016/080745, International Search Report dated Feb. 20, 2017 (Three (3) pages).
German Search Report issued in German counterpart application No. 10 2015 225 409.7 dated Nov. 25, 2016, with Statement of Relevancy (Eight (8) pages).

* cited by examiner

CONTROL UNIT AND METHOD FOR DEFINING MOVEMENT REGIONS

CROSS REFERENCE TO RELATED APPLICATIONS

This application is a continuation of PCT International Application No. PCT/EP2016/080745, filed Dec. 13, 2016, which claims priority under 35 U.S.C. § 119 from German Patent Application No. 10 2015 225 409.7, filed Dec. 16, 2015, the entire disclosures of which are herein expressly incorporated by reference.

BACKGROUND AND SUMMARY OF THE INVENTION

The invention relates to a method and a corresponding apparatus, such as a control unit or a vehicle, for example, for delimiting movement regions in road traffic.

Situations in which multiple road users have to share a roadway together, in particular a lane together, repeatedly occur in road traffic. By way of example, a frequent occurrence is that a motor vehicle (an automobile, for example) overtakes a cyclist in the same lane. Misunderstandings may arise between the road users in such situations and hence there may be potential endangerment of the road users.

The present document considers the technical problem of providing an apparatus and a corresponding method that facilitate clear and effective communication between road users on a shared roadway. In particular, an endangerment of the road users in road traffic should be reduced in the process.

According to one aspect of the invention, a control unit for a vehicle, in particular for a road motor vehicle such as, for example, a truck or an automobile, is described. The vehicle is configured to drive on a roadway. The control unit can be configured to autonomously carry out the longitudinal and transverse guidance of the vehicle, optionally without intervention by an occupant of the vehicle. In particular, this may be a highly automated vehicle, in which a driver of the vehicle is completely relieved from the task of driving.

The control unit is configured to detect another road user on the roadway. For this purpose, the control unit can ascertain environment data in respect of an environment of the vehicle and detect the other road user on the basis of the environment data. The environment data can be provided by one or more environment sensors of the vehicle and/or by way of V2X (vehicle-to-vehicle or vehicle-to-infrastructure) communication.

The control unit is further configured to ascertain a portion of the roadway (ahead) in which the other road user can move. In particular, the control unit can be configured to subdivide the roadway lying ahead of the vehicle in the movement direction into a first portion and into a second portion, wherein the vehicle can move in the first portion and wherein the other road user can move in the second portion.

Moreover, the control unit is configured to prompt communication means of the vehicle to generate an optical output, by means of which the other road user is indicated the portion (in particular the second portion) in which the other road user can move on the roadway. Here, the optical output can be designed, in particular, in such a way that the optical output separates the roadway into a first portion and a second portion, wherein the first portion is provided for a movement of the vehicle and wherein the second portion is provided for a movement of the other road user. By way of example, the communication means can comprise a laser scanner, a laser headlamp and/or a multiplicity of projectors, in particular micro-projectors.

As a result of an optically presented subdivision of the roadway into (at least) two portions for the movement of the vehicle and for the movement of the other road user, it is possible to bring about clear communication between the vehicle and the other road user in relation to future movements of the vehicle and of the other road user. Thus, it is possible to avoid a misunderstanding between the vehicle and the other road user (in respect of the respective movement directions) and a collision resulting therefrom.

The control unit can be configured to predict a movement trajectory of the vehicle on the roadway. This applies to an automatically driving vehicle, in particular. However, even in the case of a manually driven vehicle, it is possible to predict a movement trajectory of the vehicle, in particular on the basis of the position of the wheels. The first portion of the roadway, in which the vehicle will move, can be ascertained on the basis of the movement trajectory. From this, it is possible, in turn, to ascertain the second portion of the roadway (by excluding the first portion), in which the other road user can move. Consequently, the portion of the roadway in which the other road user can move can be ascertained precisely on the basis of the predicted movement trajectory of the vehicle.

The control unit can be further configured to ascertain a property of the other road user. Exemplary properties of the other road user are: a type of the road user, in particular a two-track motor vehicle, a single-track motor vehicle, a cyclist and/or a pedestrian; a space requirement of the road user; a movement speed of the road user, and/or a driving style of the road user. The portion of the roadway in which the other road user can move can then be ascertained depending on the property of the road user. In particular, the second portion of the roadway assigned to the other road user can be selected to be sufficiently wide in order to facilitate a safe movement for the other road user.

By way of example, the optical output can comprise a separating line (e.g., a virtual lane separating line), projected onto the roadway, between the second portion of the roadway in which the other road user can move and the first portion of the roadway in which the vehicle moves or will move. By way of example, this separating line can be projected in front of the vehicle in the movement direction when the vehicle overtakes the other road user. This can effectively indicate to the other road user how they can move without a collision during the overtaking maneuver.

Alternatively, or in addition thereto, the optical output can comprise a region of the roadway that is illuminated on the roadway, the region indicating a predicted movement trajectory of the vehicle. Then, the non-illuminated region of the roadway indicates the portion of the roadway in which the other road user can move without a collision.

The control unit can be configured (in the case of a manually driven vehicle, in particular) to capture an input by a driver of the vehicle. Then, the communication means of the vehicle can be prompted to generate the optical output (optionally only) in response to the input. Thus, the driver can embrace a monitoring function. In particular, an optical output may optionally be suppressed if the driver has ascertained that the other road user already has sufficient information about the planned movement of the vehicle.

Moreover, the control unit can be configured to prompt an indication unit of the vehicle (e.g., in the interior of the vehicle) to generate an internal output for an occupant of the vehicle, wherein the internal output indicates information in relation to the optical output. Thus, the occupant of the vehicle can be informed about autonomous communication of the vehicle with another road user.

The control unit can be further configured to determine that the other road user has left or, within a predetermined time interval, will leave the portion of the roadway in which the other road user can move. Thereupon, the control unit can prompt the communication means of the vehicle to generate an acoustic output in order to make the other road user aware of the portion of the roadway that was assigned in the optical output. This can cause the other road user (substantially) not to leave the assigned portion. Consequently, this can further reduce the risk of a collision.

According to a further aspect, a method for avoiding a collision between a vehicle and another road user is described. The vehicle and the other road user move on a shared roadway. The method includes detecting the other road user on the roadway. Moreover, the method includes assigning a portion of the roadway in which the other road user can move. Furthermore, the method includes generating an optical output by means of which the other road user is indicated the portion in which the other road user can move on the roadway.

A vehicle (in particular a two-track road vehicle, for example, an automobile or a truck) is described according to a further aspect, the vehicle comprising the control unit described in this document.

A software (SW) program is described according to a further aspect. The SW program can be configured to be carried out on a processor (e.g., on a controller of a vehicle) and thereby to carry out the method described in this document.

A storage medium is described according to a further aspect. The storage medium may comprise a SW program that is configured to be carried out on a processor and thereby to carry out the method described in this document.

It should be noted that the methods, apparatuses and systems described in this document can be used both on their own and in combination with other methods, apparatuses and systems described in this document. Moreover, all aspects of the methods, apparatuses and systems described in this document can be combined with one another in various ways. In particular, the features of the claims can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

As presented at the outset, the present document deals with facilitating an efficient and clear communication between road users on a shared roadway. As a result of clear communication between the road users, it is possible to avoid hazardous situations, in particular a collision between the road users.

Figure 1:
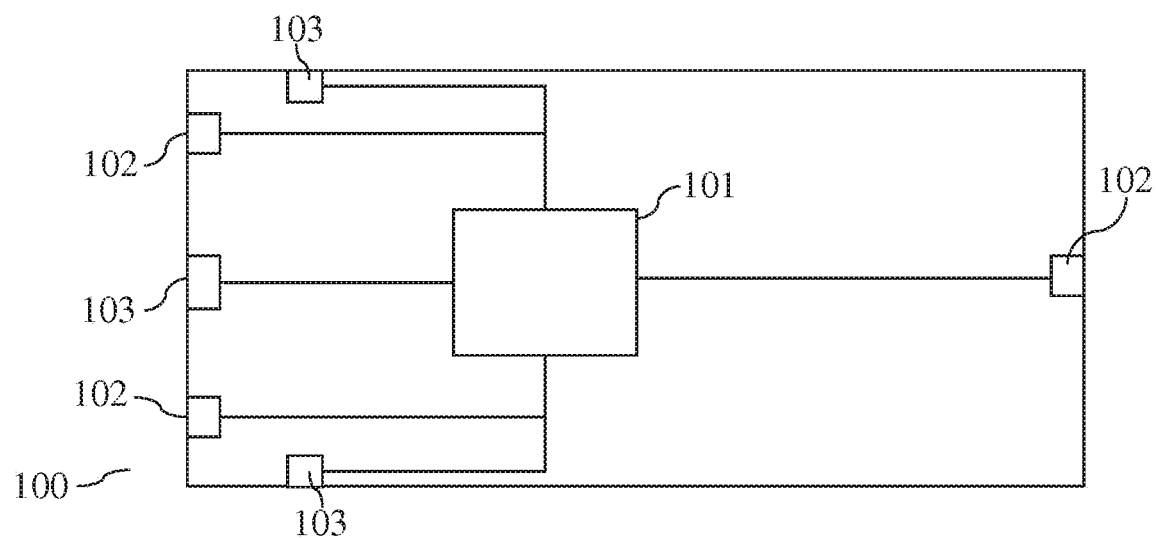
FIG. 1 shows a block diagram with exemplary components of a vehicle.

FIG. 1 shows a block diagram of selected components of a vehicle 100. In particular, FIG. 1 shows a control unit 101 for a vehicle 100, wherein the control unit 101 is configured to facilitate direct communication between the vehicle 100 and one or more road users in the surroundings of the vehicle 100. The direct communication can be a form of communication that can be perceived directly by a sensory organ of a human, in particular without this requiring a telecommunications device. To this end, the control unit 101 can be configured to prompt communication means 102 of the vehicle 100 and to output information to the one or more road users in optical and/or acoustic form. This information can then be perceived directly by the eyes and/or ears of the one or more road users (e.g., of a driver of a vehicle and/or a pedestrian). In particular, an optical output can be generated by the communication means 102.

The vehicle 100 comprises one or more environment sensors 103 that are configured to capture information items in respect of the environment or the surroundings of the vehicle 100. By way of example, the one or more environment sensors 103 can comprise an (infrared, visible light) camera, by means of which it is possible to capture image information items about the environment. On the basis of the image information items, it is possible to capture, for example, another road user in front of, or next to, the vehicle 100, for example a pedestrian or another vehicle. Alternatively, or in addition thereto, the one or more environment sensors 103 can comprise a radar sensor by means of which it is possible to ascertain a distance between the vehicle 100 and another road user, for example. The data provided by the one or more environment sensors 103 can be referred to as environment data.

The control unit 101 is configured to receive the environment data from the one or more environment sensors 103. Moreover, the control unit 101 is configured to detect one or more road users in the surroundings of the vehicle 100, in particular in the surroundings in front of, to the side of and/or behind the vehicle 100, on the basis of the environment data.

Figure 2A:
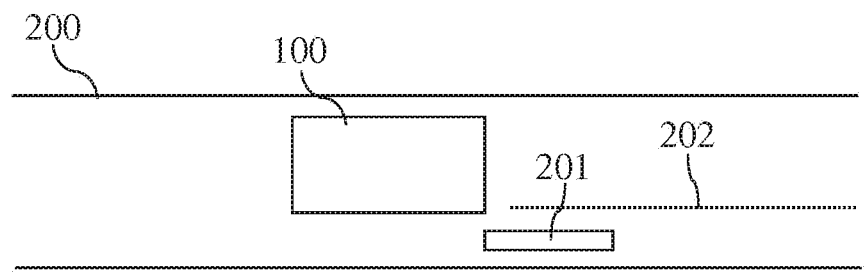
FIGS. 2a and 2b show exemplary hazardous situations between road users on a shared roadway.
Figure 2B:
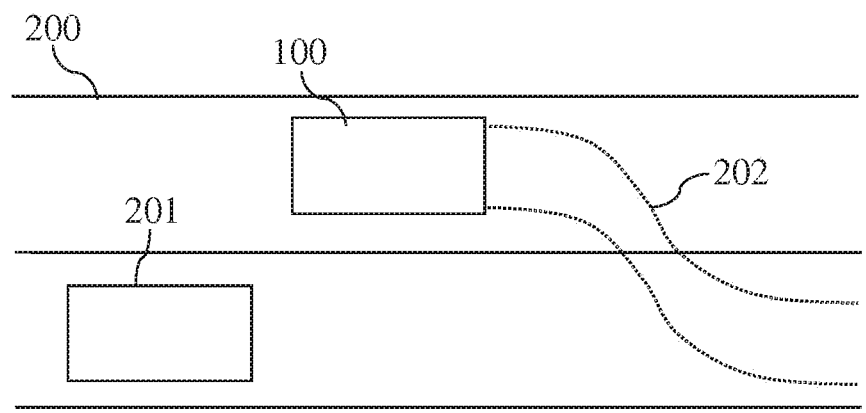

FIGS. 2a and 2b show exemplary situations on a roadway 200, in which there could be a collision between a vehicle 100 and another road user 201. In particular, FIG. 2a shows a vehicle 100 that is overtaking a cyclist 201 in a current lane and that could collide with the cyclist 201 in the process. The control unit 101 of the vehicle 100 is configured to detect the cyclist 201 on the basis of the environment data. Moreover, the control unit 101 is configured to prompt the communication means 102 of the vehicle 100 (in particular an optical output unit, for instance a laser) to generate an optical output 202 that indicates to the cyclist 201 the region of the roadway 200 that the vehicle 100 is leaving for the cyclist 201. Expressed differently, the optical output 202 indicates the region of the roadway 200 in which the cyclist 201 can ride without colliding with the vehicle 100 in the process.

The control unit 101 of the vehicle 100 can be configured to predict a movement trajectory of the vehicle 100. In particular, the movement trajectory of the vehicle 100 can be predicted on the basis of a current position of the wheels of the vehicle 100. On the basis of the predicted movement trajectory of the vehicle 100, the roadway 200 lying ahead of the vehicle 100 can be subdivided into (at least) two portions, a first portion in which the vehicle 100 will probably move and a second portion in which the vehicle 100 will probably not move, and which therefore can be assigned to another road user 201 (in particular the cyclist from FIG. 2a).

As a result of the optical output 202, it is possible to communicate to the other road user 201 the portion of the roadway 200 that is available for the other road user 201. By way of example, the optical output 202 can comprise a projected separating line (as illustrated in FIG. 2a) by means of which the roadway 200 is divided into two portions. Consequently, the vehicle 100 can communicate to the other road user 201 by way of an optical output 202 the portion of the roadway 200 that can be safely used by the other road user 201. Expressed differently, it is possible by means of the optical output 202 to communicate the portion of the roadway 200 that will be used by the vehicle 100, with the remaining region of the roadway 200 then corresponding to the portion of the roadway 200 that can be used by the other road user 201.

FIG. 2b shows a further example, in which the vehicle 100 wishes to change the lane of a roadway 200. In the illustrated example, the optical output 202 comprises a light tube extending in front of the vehicle 100, the light tube indicating to the other road user 201 the portion of the roadway 200 that will be used by the vehicle 100 on account of the lane change and that is therefore not available to the other road user 201 (e.g., another vehicle). Such an indication can also clearly communicate the movement intention of the vehicle 100, and so collisions can be avoided.

Figure 3:
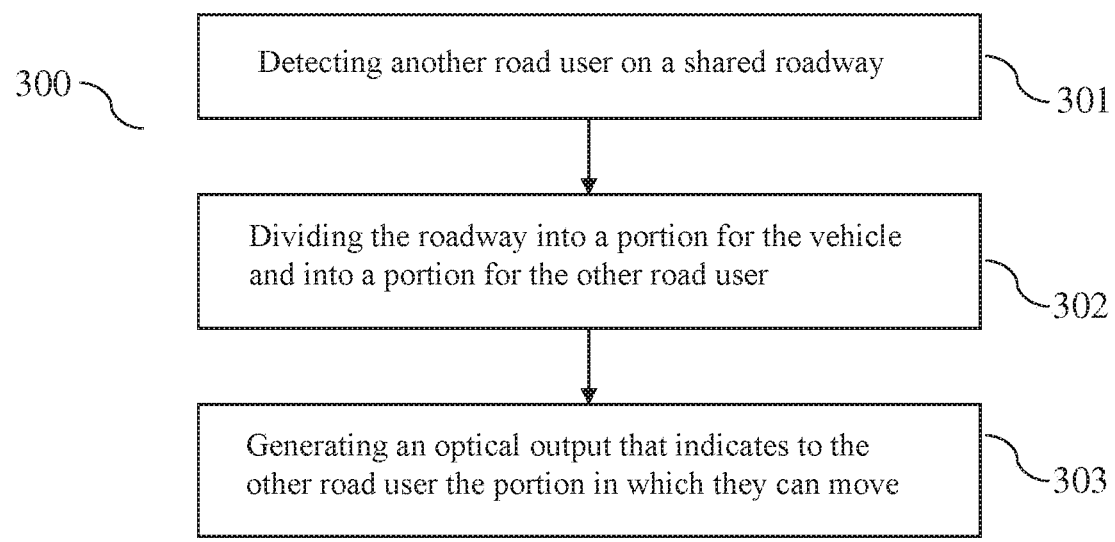
FIG. 3 shows a flowchart of an exemplary method for communication between road users on a shared roadway.

FIG. 3 shows a flowchart of an exemplary method 300 for avoiding a collision between a vehicle 100 and another road user 201, wherein the vehicle 100 and the other road user 201 are moving on a roadway 200. The method 300 can be carried out by a control unit 101 of the vehicle 100.

The method 300 comprises detecting 301 the other road user 201 on the roadway 200, for example on the basis of environment data that were captured by one or more environment sensors 103 of the vehicle 100 and/or that are provided in the vehicle 100 via V2X (vehicle-to-vehicle or vehicle-to-infrastructure) communication.

Moreover, the method 300 includes assigning 302 a portion of the roadway 200 in which the other road user 201 can move. In particular, the control unit 101 of the vehicle 100 can assign to the other road user 201 a portion of the roadway 200 (ahead), in which the other road user 201 can move without colliding with the vehicle 100. To this end, the roadway 200 (ahead) can be subdivided into at least two portions, a first portion for the future movement of the vehicle 100 and a second portion for the future movement of the other road user 201. In the movement direction of the vehicle 100 and/or of the other road user 201, these two portions can lie next to one another.

Furthermore, the method 300 includes generating 303 an optical output 202 by means of which the other road user 201 is indicated the portion in which the other road user 201 can move on the roadway 200. Thus, a collision between the vehicle 100 and the other road user 201 can be avoided in an efficient and reliable manner.

Consequently, the control unit 101 of a vehicle 100 can be configured to assign a movement region to another road user 201 by way of a virtual roadway separation 202. To this end, it is possible by means of the sensor system 103, a digital information interchange (e.g., via WLAN) and/or by means of backend information items, i.e., on the basis of the environment data, to:
  detect another road user 201;
  ascertain properties (e.g., mode of propagation, driving style, space requirement (e.g., as a result of a trailer)) and/or intentions of the other road user 201;
  ascertain current laws and traffic laws; and/or
  ascertain an environment of the vehicle 100 (e.g., type of road/traffic situation, further road users and their properties, weather conditions, road conditions, light conditions, etc.).

Then, the movement region of the vehicle 100 and the one or more movement regions of the one or more other road users 201 can be determined on the basis of the information about the environment and/or the other road user 201 and on the basis of the intentions (i.e., in particular, the predicted movement trajectory) of the vehicle 100.

By means of an optical output (in particular by way of a projection) 202 on the roadway 200 (e.g., a two-dimensional display, for instance of a bike path/footpath or a separation line), the one or more other road users 201 are assigned a certain movement region or the roadway 202 is separated into portions for the vehicle 100 and for the one or more other road users 201 (as illustrated in FIG. 2a, for example). As a result, the vehicle 100 indicates that the one or more other road users 201 (e.g., cyclists, pedestrians, automobile drivers) should not leave their respectively assigned regions. Moreover, another road user 201 is provided with information by way of the optical output 202 that their region will not be entered by the vehicle 100.

The marking of the roadway regions by projection can be effectuated, for example, by actuatable laser scanners, laser headlamps and/or by micro-projectors as communication means 102 in the vehicle 100.

Additionally, the other road user 201 can be warned by way of an acoustic output of the vehicle 100, particularly if the other road user 201 leaves their assigned region or if, on account of the trajectory of the other road user 201, the control unit 101 anticipates that the other road user 201 will soon leave their assigned region.

The method 300 described in this document can preferably be used in the (highly) automated mode and/or, alternatively, in the case of manual or assisted driving of the vehicle 100. For manual/assisted driving, the vehicle 100 may comprise an operating element and, where necessary, a display that allow a user of the vehicle 100 to prompt the generation of the optical output 202. In particular, the optical output 202 or the acoustic warning for other road users can be activated by way of an operating element. Furthermore, the user can have indicated via a display the movement region that is available to the vehicle 100 and/or the movement region that was assigned to another road user 201. The display in the cockpit of the vehicle 100 can also be presented during automated driving.

Particularly in the case of manual or assisted driving, the control unit 101 can additionally be coupled to a visual, haptic and/or acoustic lane departure warning or to information about the presence of the other road user 201. Expressed differently, the driver of the vehicle 100 can receive a visual, haptic and/or acoustic warning if the other road user 201 leaves or will leave their assigned portion. Consequently, it is possible to provide visual, haptic and/or acoustic feedback about the movement of the other road user 201 to the driver of the vehicle 100. This can further reduce the risk of a collision.

By means of the method 300 described in this document, the control unit 101 can be configured not only to separate individual lanes but possibly also to separate entire roadways 200. By way of example, an optical output 202 can be generated in the case of a lane change or when pulling into a lane, the optical output assigning respective movement regions to the vehicle 100 and at least one other road user 201 (see FIG. 2b), in which they can each move safely.

Moreover, a recommended movement region for another road user 201 can be indicated by way of an optical output 202.

The vehicle 100 described in this document can consequently present the movement regions of one or more other road users 201 in optical fashion on a roadway 200.

In order to ideally present the optical output 202 depending on the condition and/or alignment of the projection area, the control unit 101 of the vehicle 100 can ascertain the projection area or the topology of the surroundings (e.g., curb) (e.g., on the basis of the environment data) and take this into account when generating the optical output 202. Expressed differently, the control unit 101 can be configured to ascertain an environment condition (in particular a projection condition) and adapt the optical output 202 depending on the environment condition.

The optical output 202 can be effectuated in such a way that it allows another road user 201 to identify the vehicle 100 from which the optical output 202 is generated. By way of example, this can be effectuated in the form of an optical connection (luminescent strip) between the emitting vehicle 100 and the optical output 202 and/or the other road user 201.

By way of the method 300 described in this document, it is possible to avoid misunderstandings in road traffic by means of a clear assignment of movement regions for the road users 100, 201, as a result of which the safety in road traffic increases in turn. In particular, the method 300 facilitates clear, unequivocal and unambiguous communication between highly automated or autonomous vehicles 100 and other road users 201, and consequently facilitates a friction-free interaction with other road users 201. Moreover, the traffic flow can be improved. Moreover, the comfort for a driver of the vehicle 100 can be increased (particularly in the case of a highly automated vehicle 100) as a result of autonomous and reliable communication of a vehicle 100 as the driver has to carry out fewer monitoring functions. Moreover, the confidence of other road users 201 in the highly automated driving vehicle 100 can be increased as a result of clear communication.

The present invention is not restricted to the shown exemplary embodiments. In particular, it should be noted that the description and the Figures are only intended to elucidate the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component for a vehicle configured to drive on a roadway, comprising:
  a control unit, wherein the control unit is configured to:
    detect a road user on the roadway external to the vehicle, wherein the type of the road user is a two-track motor vehicle or a single-track motor vehicle or a cyclist or a pedestrian;
    ascertain a property of the road user, comprising one or more of: a type of the road user, a space requirement of the road user, a movement speed of the road user; and a driving style of the road user;
    ascertain that a portion of the roadway is one in which the road user can safely move, based on the detected road user, the property of the road user, and a movement trajectory of the vehicle;
    determine that the road user has left or, within a predetermined time interval, will leave the portion of the roadway in which the road user can move;
    prompt the communication means to generate an acoustic output in order to make the road user aware of the portion of the roadway; and
    prompt a communication means of the vehicle to generate an optical output onto the roadway that indicates to the road user the portion of the roadway in which the control unit has ascertained that the road user can safely move relative to a portion of the roadway occupied by the movement trajectory of the vehicle.

2. The component as claimed in claim 1, wherein the control unit is further configured to:
  predict a movement trajectory of the vehicle on the roadway; and
  ascertain the portion of the roadway in which the road user can move on a basis of the movement trajectory of the vehicle.

3. The component as claimed in claim 1, wherein:
  the optical output separates the roadway into a first portion and a second portion;
  the first portion is provided for a movement of the vehicle; and
  the second portion is the portion of the roadway in which the road user can move.

4. The component as claimed in claim 1, wherein the optical output comprises one or more of:
  a separating line projected onto the roadway between the portion of the roadway in which the road user can move and a further portion of the roadway in which the vehicle moves; and
  a region of the roadway that is illuminated on the roadway, wherein the region indicates a predicted movement trajectory of the vehicle.

5. The component as claimed in claim 1, wherein the communication means comprises one or more of:
  a laser scanner;
  a laser headlamp; and
  a multiplicity of projectors.

6. The component as claimed in claim 5, wherein the projectors are micro-projectors.

7. The component as claimed in claim 1, wherein the control unit is further configured to:
  capture an input by a driver of the vehicle; and
  prompt the communication means to generate the optical output in response to the input.

8. The component as claimed in claim 1, wherein:
  the control unit is further configured to prompt an indication unit of the vehicle to generate an internal output to an occupant of the vehicle; and
  the internal output indicates information in relation to the optical output.

9. A vehicle comprising a component as claimed in claim 1.

10. A method for avoiding a collision between a vehicle and a road user which move on a roadway, comprising the acts of:
  detecting the road user on the roadway external to the vehicle, wherein the type of the road user is a two-track motor vehicle or a single-track motor vehicle or a cyclist or a pedestrian;
  ascertaining a property of the road user, comprising one or more of: a type of the road user, a space requirement of the road user, a movement speed of the road user; and a driving style of the road user;

assigning a that a portion of the roadway is one in which the road user can safely move, based on the detected road user, the property of the road user, and a movement trajectory of the vehicle;

determining that the road user has left or, within a predetermined time interval, will leave the portion of the roadway in which the road user can move;

generating an acoustic output in order to make the road user aware of the portion of the roadway; and generating an optical output onto the roadway that indicates to the road user the portion of the roadway in which the control unit has ascertained that the road user can safely move relative to a portion of the roadway occupied by the movement trajectory of the vehicle.

\* \* \* \* \*